United States Patent
Le et al.

(10) Patent No.: US 10,155,866 B2
(45) Date of Patent: Dec. 18, 2018

(54) COMPOSITIONS INCLUDING ASPHALT COMPONENT AND GRAPHITE COMPONENT

(71) Applicant: REGENTS OF THE UNIVERSITY OF MINNESOTA, Minneapolis, MN (US)

(72) Inventors: Jialiang Le, Roseville, MN (US); Mihai Octavian Marasteanu, Roseville, MN (US); Mugurel Ioan Turos, Minnetonka, MN (US)

(73) Assignee: REGENTS OF THE UNIVERSITY OF MINNESOTA, Minneapolis, MN (US)

(*) Notice: Subject to any disclaimer, the term of this patent is extended or adjusted under 35 U.S.C. 154(b) by 0 days.

(21) Appl. No.: 15/443,549

(22) Filed: Feb. 27, 2017

(65) Prior Publication Data
US 2017/0166723 A1   Jun. 15, 2017

Related U.S. Application Data (63) Continuation of application No. 14/682,136, filed on Apr. 9, 2015, now abandoned.
(Continued)

(51) Int. Cl.
| | |
|---|---|
| C08L 95/00 | (2006.01) |
| C09D 195/00 | (2006.01) |
| C08K 3/04 | (2006.01) |
| E04D 1/12 | (2006.01) |
| E01C 7/18 | (2006.01) |
| E01C 11/00 | (2006.01) |
| E01C 19/48 | (2006.01) |

(52) U.S. Cl.
CPC .............. *C08L 95/00* (2013.01); *C08K 3/04* (2013.01); *C09D 195/00* (2013.01); *E01C 7/182* (2013.01); *E01C 11/005* (2013.01); *E01C 19/48* (2013.01); *E04D 1/12* (2013.01); *C08L 2207/22* (2013.01); *C08L 2555/30* (2013.01); *C08L 2555/34* (2013.01); *C08L 2555/40* (2013.01); *Y02A 30/333* (2018.01)

(58) Field of Classification Search
CPC ......... C08L 95/00; C09D 195/00; C10C 3/00; C08K 3/04
See application file for complete search history.

(56) References Cited

U.S. PATENT DOCUMENTS

| | | |
|---|---|---|
| 7,335,251 B2 | 2/2008 | Dupuis et al. |
| RE41,167 E | 3/2010 | Stuart, Jr. et al. |

(Continued)

FOREIGN PATENT DOCUMENTS

| | | |
|---|---|---|
| CA | 2792497 A1 | 9/2011 |
| WO | WO 2007/078228 A1 | 7/2007 |
| WO | WO 2012/103206 A2 | 8/2012 |

OTHER PUBLICATIONS

Xiaoming Liu, Shaopeng Wu, Qunshan Ye, Jian Qui, Bo Li, Properties evaluation of asphalt-based composites with graphite and mine powders, Construction and Building Materials, vol. 22, Issue 3, Mar. 2008, pp. 121-126 ISSN 0950-0618.*

(Continued)

*Primary Examiner* — Jennifer A Smith
*Assistant Examiner* — Alexandra M Moore
(74) *Attorney, Agent, or Firm* — Mueting, Raasch & Gebhardt, PA (57) ABSTRACT

A composition that includes asphalt component; and graphite component.

17 Claims, 6 Drawing Sheets

Related U.S. Application Data (60) Provisional application No. 61/977,706, filed on Apr. 10, 2014, provisional application No. 61/977,707, filed on Apr. 10, 2014.

(56) References Cited

U.S. PATENT DOCUMENTS

| | | |
|---|---|---|
| 2007/0221095 A1 | 9/2007 | Mehta et al. |
| 2008/0058470 A1 | 3/2008 | Shaghaghi et al. |
| 2009/0107292 A1 | 4/2009 | Ahlin et al. |
| 2011/0269876 A1 | 11/2011 | Rowe et al. |

OTHER PUBLICATIONS

Wolf Sean, Benefits of Recycling Asphalt Shingles and Asphalt Pavement, Wolf Paving Blog, Apr. 13, 2012 http://www.wolfpaving.com/blog/bid/81660/Benefits-of-Recycling-Asphalt-Shingles-and-Asphalt-Pavement.*

American Association of State and Highway Transportation Officials (AASHHTO), "Determining the Flexural Creep Stiffness of Asphalt Binder Using Bending Beam Rheometer (BBR)," *Standard by American Association of State and Highway Transportation Officials*, AASHTO Designation: T 313-12; Jan. 2012: 21 pgs.

Liu, "Properties evaluation of asphalt-based composites with graphite and mine powders" Mar. 2008 *Construction and Building Materials*, 22(3):121-126.

Wolf, "Benefits of Recycling Asphalt Shingles and Asphalt Pavement" Apr. 13, 2012 Wolf Paving Blog. Online: http://www.wolfpaving.com/blog/bid/81660/Benefits-of-Recycling-Asphalt-Shingles-and-Asphalt-Pavement.

Wu, "Investigation of the conductivity of asphalt concrete containing conductive fillers" Jun. 2005 *Carbon*, 43(7):1358-1363.

* cited by examiner

COMPOSITIONS INCLUDING ASPHALT COMPONENT AND GRAPHITE COMPONENT

PRIORITY

This application is a continuation of U.S. patent application Ser. No. 14/682,136, filed on Apr. 9, 2015, which claims priority to U.S. Provisional Application Nos. 61/977,706 entitled COMPOSITIONS INCLUDING ASPHALT AND GRAPHITE COMPONENT filed on Apr. 10, 2014 and 61/977,707 entitled COMPOSITIONS INCLUDING ASPHALT AND GRAPHITE COMPONENT filed on Apr. 10, 2014, the disclosures of which are incorporated herein by reference thereto.

GOVERNMENT FUNDING

This invention was made with government support under NCHRP-173 awarded by the National Cooperative Highway Research Program. The government has certain rights in the invention.

SUMMARY

This disclosure describes compositions that include asphalt components and graphite components. The compositions and articles made using the compositions may have various advantageous properties.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Asphalt pavements represent approximately 94% of the 2.5 million miles of paved roads in the United States. They are built using asphalt mixtures, which are composite materials that contain coarse and fine aggregates of specific sizes bound together with asphalt binder, a petroleum product. Asphalt binder is a highly temperature-susceptible viscoelastic material that flows like motor-grade oil at high temperatures and becomes as brittle as glass at low temperatures. In some modes of use, asphalt mixtures are produced in asphalt plants, in which the heated aggregates (95% by weight in some examples) are mixed with the hot liquid asphalt binder (5% by weight in some examples) and are then stored or discharged into trucks that deliver the asphalt mixture to the construction site, where it is laid down and compacted with specialized equipment. Asphalt, which can also be referred to as bitumen, is also utilized in roofing products such as shingles, roofing felts and flat roof sealing products.

Disclosed herein are compositions that include at least some asphalt component and some graphite component. Disclosed compositions may provide advantageous mechanical properties, processing properties, or combinations thereof. Specific illustrative disclosed compositions represent novel multi-functional pavement materials having superior mechanical properties over the entire range of pavement service temperatures. Their use could serve to improve the performance of asphalt pavements under traffic loading and extreme weather conditions.

Asphalt can be described as a solid or semisolid bituminous material that can be either naturally occurring or produced from petroleum refining processes. Asphalt can be described as including four types of compounds: saturated hydrocarbons, naphthene aromatics (consisting of polycyclic aromatic compounds), polar aromatics (consisting of high molecular weight phenols and carboxylic acids), and asphaltenes (consisting of high molecular weight phenols and heterocyclic compounds). All types of asphalt, naturally occurring, synthetically manufactured and modified may be used in disclosed compositions. Naturally occurring asphalt can include native rock asphalt, lake asphalt, and the like. Synthetically manufactured asphalt is a byproduct of petroleum refining or post-refining operations and can include air-blown asphalt, blended asphalt, cracked or residual asphalt, petroleum asphalt, propane asphalt, straight-run asphalt, thermal asphalt, and the like.

As used herein "asphalt component" can include any material or mixture of material that includes any type of asphalt (e.g., naturally occurring, synthetically manufactured, or natural or synthetic and then modified). Illustrative examples of specific asphalt components can include asphalt binders, asphalt emulsions, roof binders, recycled asphalt pavement (RAP), recycled asphalt shingles (RAS), or combinations thereof.

An illustrative type of asphalt component includes asphalt binder. In some embodiments disclosed compositions can include asphalt binder. Asphalt binders can be combined with aggregates (for example aggregates of various sizes) to form compositions that can be utilized as asphalt pavements or asphalt concrete. Asphalt binders can be described as a temperature-susceptible viscoelastic material that flows like motor-grade oil at high temperatures and becomes as brittle as glass at low temperatures. Asphalt binders are commonly obtained from petroleum refining, for example. Asphalt binders can be used as obtained from the petroleum refining process or can be modified. For example, asphalt binders can be modified using polymers to form polymer modified asphalt binders. Disclosed compositions can utilize unmodified asphalt binders or modified asphalt binders for example.

Disclosed compositions also include a graphite component. Graphite components can be described as graphite that may have a regular shape or an irregular shape, a reproducible shape or a non-reproducible shape. The graphite component does not include forms of graphite that have a tube or tubular cylindrical structure. The graphite component can include graphite components that have a size in the micrometer range, a size in the nanometer range, or combinations thereof. In some embodiments, a graphite component that has a size in the nanometer range, such as graphite nano-platelets can be utilized. In some embodiments, a graphite component that has a size in the micrometer range, such as graphite micro-flakes can be utilized. The graphite component utilized herein does not include single-wall or multi-wall carbon nanotubes. In some embodiments, graphite nano-platelets can be utilized. Graphite nano-platelets can be described as having a relatively thin but wide aspect ratio, which does not exhibit surface crystallographic features that are typically visible in conventional flake graphite particles. In some embodiments, graphite micro-flakes can be utilized. Graphite micro-flakes can be made from natural flake graphite, where the aspect ratio and general morphological character of the parent flake graphite are maintained.

It is thought, but not relied upon that appropriate amounts of graphite component may form a network of discrete particles that increases the stiffness of these asphalt binders and consequently, of the final composition. This network may also effectively arrest potential crack propagation in asphalt binders and significantly improve the overall fracture properties of the binders at low temperatures. This effect could also be noticeable in asphalt mixtures prepared with these binders, which is of great importance for mitigating the risk of low-temperature cracking and fatigue cracking in asphalt pavement preparations.

Disclosed compositions can be characterized by describing the amount of the graphite component with respect to the amount of the asphalt component. In some embodiments, compositions can include not greater than 30% by weight of the graphite component with respect to the asphalt component. In some embodiments, compositions can include not greater than 10% by weight of the graphite component with respect to the asphalt component. In some embodiments, compositions can include not greater than 8% by weight of the graphite component with respect to the asphalt component. In some embodiments, compositions can include not greater than 6% by weight of the graphite component with respect to the asphalt component. In some embodiments, compositions can include not less than 2% by weight of the graphite component with respect to the asphalt component. In some embodiments, compositions can include not less than 3% by weight of the graphite component with respect to the asphalt component.

Disclosed compositions can be characterized by describing the amount of the graphite component with respect to the amount of asphalt binder. In some embodiments, compositions can include not greater than 30% by weight of the graphite component with respect to the asphalt binder. In some embodiments, compositions can include not greater than 10% by weight of the graphite component with respect to the asphalt binder. In some embodiments, compositions can include not greater than 8% by weight of the graphite component with respect to the asphalt binder. In some embodiments, compositions can include not greater than 6% by weight of the graphite component with respect to the asphalt binder. In some embodiments, compositions can include not less than 2% by weight of the graphite component with respect to the asphalt binder. In some embodiments, compositions can include not less than 3% by weight of the graphite component with respect to the asphalt binder.

Some disclosed compositions that contain asphalt binders can also include aggregates, for example. In some embodiments, compositions can include different sized aggregates, for example both coarse and fine aggregates of specific sizes can be utilized in order to provide a final composition (e.g., an asphalt pavement) having desired properties. Compositions including asphalt binder, aggregates and graphite component can be produced in asphalt plants, where heated aggregates are mixed with the hot liquid asphalt binder. Such compositions can be stored or discharged into trucks that deliver the composition (which can be referred to as an asphalt mixture) to a construction site where it can be laid down and compacted with specialized equipment.

Some disclosed compositions can also include a second asphalt component. For example, an illustrative composition can include graphite component, asphalt binder and a recycled asphalt product (for example recycled asphalt pavement "RAP"). In some embodiments, the RAP could be described as including, at the time it was originally formed, at least asphalt binder and aggregate. Another example of a second asphalt component could include other reclaimed asphalt containing products, for example reclaimed asphalt shingles ("RAS"). Disclosed compositions could also include other types of secondary asphalt components not specifically enumerated herein.

Illustrative disclosed compositions can include, for example asphalt binder and a graphite component. Such disclosed compositions can be made and then added to aggregate (or vice versa) to form an asphalt pavement composition, for example. Such disclosed compositions could also be made and then added to aggregate (or vice versa), RAP, RAS, other secondary asphalt components, or some combination thereof. Such disclosed compositions could also be made and then added to components (or vice versa) such as fiberglass mats that may be impregnated or coated with a mixture of asphalt, mineral filler, or both to manufacture various articles, including for example roofing articles.

In some embodiments, illustrative disclosed compositions can include, for example asphalt binder, aggregate and graphite component. Such disclosed compositions can be made by forming an asphalt mixture and then adding the graphite component. Asphalt mixture, as that phrase is utilized herein can refer to a composition that includes at least asphalt binder and aggregate. The addition of a graphite component to such compositions may decrease the effort required to compact the material into a final asphalt product (e.g., asphalt paved road), decrease the temperature necessary to compact the material into a final asphalt product, or some combination thereof.

Temperature of processing or production can greatly affect asphalt binders. As such, the compaction of asphalt mixtures (containing asphalt binder) can also be influenced by the temperature of the mixture deposited at a construction site (for example). If the temperature drops below a certain value, called cessation temperature, the mixture cannot be compacted anymore. More recent advances, called warm mix asphalt, uses various additives to increase the compactability of the mixtures and make the compaction process less dependent on temperature. Such warm mix asphalt compositions can also benefit from the inclusion of a graphite component. Furthermore, mixtures containing high amounts of recycled materials, such as RAP and RAS, for which achieving the specific densities is more difficult can also benefit from the inclusion of a graphite component.

Also disclosed herein are methods of forming compositions. In some embodiments, a graphite component and asphalt binder can be mixed together to form an illustrative composition that can be referred to herein as a binder composition. The asphalt binder and the graphite component can be mixed, for example until substantially homogeneous to form the binder composition. Such binder compositions can then be mixed with, added to, or both, aggregate (as well as other components), for example. If final products other than an asphalt paving composition are to be made, materials other than or in addition to aggregate can be added.

Also disclosed are methods that include mixing a graphite component with an asphalt mixture (a mixture that includes aggregate and binder for example). A composition made this way can also be utilized for paving roadways (as well as other applications).

Also disclosed are methods that include mixing aggregate with an asphalt component (e.g., asphalt binder) and then mixing that mixture with a mixture obtained by mixing an asphalt component (e.g., asphalt binder) with a graphite component. The first mixture, the asphalt component plus aggregate could, but need not be RAP, RAS, or a combination thereof. Such methods may also include an optional step of reheating the asphalt component plus aggregate mixture before mixing it with the asphalt component/graphite component mixture. This optional step can be useful if a new hot asphalt mixture is produced to make a new asphalt pavement from recycled materials (e.g., RAP or RAS), for example. Alternatively, the aggregate/asphalt component mixture can be at room temperature (or there about) if the asphalt component in the asphalt component/graphite component mixture is or was in the form of a liquid asphalt emulsion, for example. This type of method may be useful, for example, for cold in place recycling and stabilization of pavement base and sub-base.

Also disclosed are methods that include mixing aggregate with a mixture of asphalt component plus graphite component. In some embodiments, the asphalt component can be an asphalt emulsion. Such methods or compositions formed using such a method can be useful for surface treatment applications for example. Such methods can be carried out at room temperature, for example, because it has been shown that graphite components can blend relatively easily with an asphalt component such as an asphalt emulsion for example.

Also disclosed are methods that include mixing a graphite component with an asphalt emulsion. Asphalt emulsions can be made with asphalt binder that has been divided into small droplets using a high speed, high shear device (for example a colloid mill) and combined with water and an emulsifying agent. Asphalt emulsions can be used in pavement applications such as cold in place recycling, surface treatments, and pavement structure stabilization, for example. Asphalt emulsions such as these can be advantageous because no heating is required and the asphalt solidifies as the water evaporates (the emulsion cures).

Disclosed compositions and methods can be utilized for any application. A specific illustrative application can include repair of roadways, for example, pothole repair. In using compositions and methods for pothole repair, the composition (e.g., a paving composition) can be deposited in an area of existing pavement, for example. Upon deposition, the composition (e.g., a paving composition) can be compacted.

EXAMPLES

The examples described herein were done following the Superpave Performance Grade (PG) Specifications that are currently used to specify the asphalt binders used in pavement applications and also serve as primary tools to investigate the behavior of asphalt binders in many research studies. The PG tests and analyses are detailed in a number of AASHTO specifications and are based on rheological measurements using a Dynamic Shear Rheometer (DSR) used to obtain complex modulus and phase angle of viscoelastic materials, a Bending Beam Rheometer (BBR) used to obtain the creep stiffness and the slope of the creep stiffness curve called m-value, and strength tests performed at low temperatures.

The examples disclosed herein include typical asphalt binders used to prepare asphalt mixtures for pavement applications. It is contemplated that similar improvements will be observed in asphalt binders used to manufacture asphalt roofing shingles, and in asphalt emulsions used in pavement applications such as cold in place recycling, surface treatments, pavement structure stabilization, and the like.

Low Temperature Rheological and Strength Testing of Un-Aged Asphalt Binder

Preliminary experiments were performed to determine the change in low temperature properties of asphalt binders when three types of graphite component were added. PG 58-28 asphalt binder (obtained from CITGO) in un-aged condition, was used. Three different graphite components were utilized: MICRO850: a Graphite micro-flake material with 99.54% Carbon, 0.28% Moisture and 0.05%+325 mesh. The average surface area is 12.95 m2/g (obtained from Asbury Carbons Inc. and referred to in the figures and text as "850"); 4827: a Graphite nano-platelet material with 99.66% Carbon and 0.34% Ash. The average surface area is 248. 92 m2/g, and mean platelet size is 2.26 microns (obtained from Asbury Carbons Inc. and referred to in the figures and text as "4827"); and TC307 a graphite nano-platelets material (obtained from Asbury Carbons Inc. and referred to in the figures and text as "TC307").

The graphite component was added to the hot asphalt binder and then mixed with a glass rod until a homogeneous mix was observed. Approximately 6% by weight of the graphite component with respect to the weight of the asphalt binder (PG58-28) was used. No problems related to potential clustering of the graphite component was detected.

Figure 1:
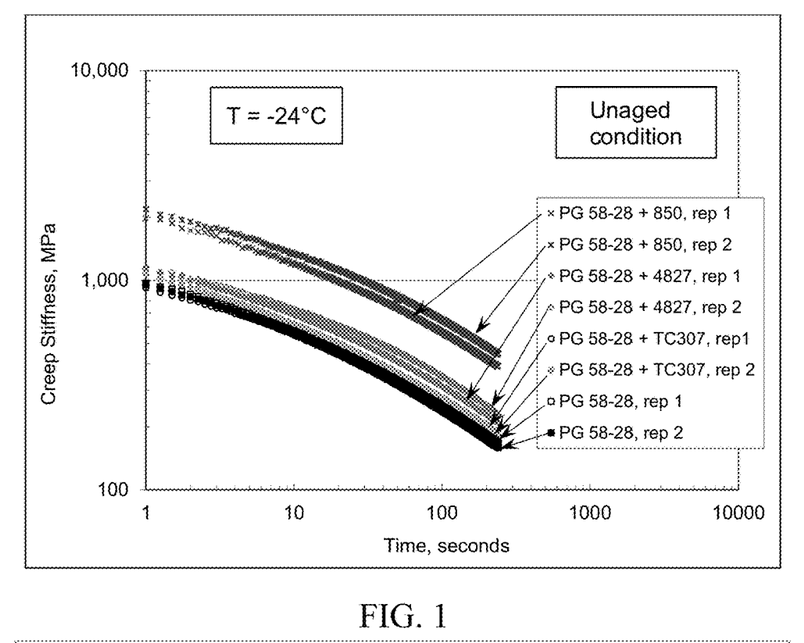
FIG. 1 shows creep stiffness (MPa) versus time for various compositions.

The Bending Beam Rheometer creep stiffness (inverse of creep compliance) results are shown in FIG. 1. The results were obtained at −24° C. and two replicates were tested. The Bending Beam Rheometer creep test specification is given by the American Association of State Highway and Transportation Officials (AASHTO) as T313-12.

It can be observed that the addition of 850 significantly increases the creep stiffness of the asphalt binder; the stiffness more than doubles compared to the plain asphalt binder. Smaller changes are observed for the other two types of graphite used in the experimental work. At the same time, the slopes of the curves do not change, which indicates that the "m-values" do not change and that the relaxation properties are not affected by the significant increase in stiffness.

Figure 2A:
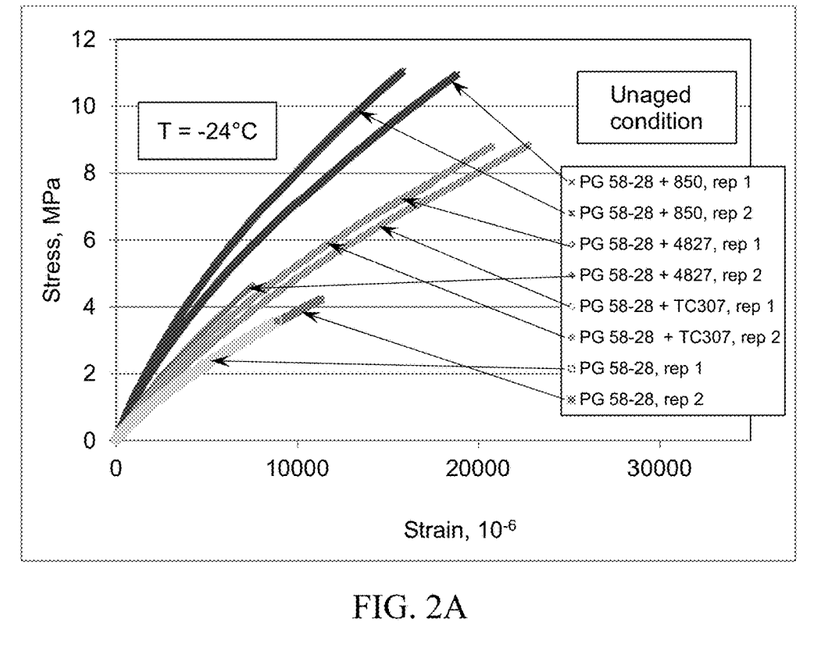
FIGS. 2A and 2B show stress (MPa) versus strain (FIG. 2A) for various compositions and a bar graph (FIG. 2B) comparing the strength (MPa) of various compositions.
Figure 2B:
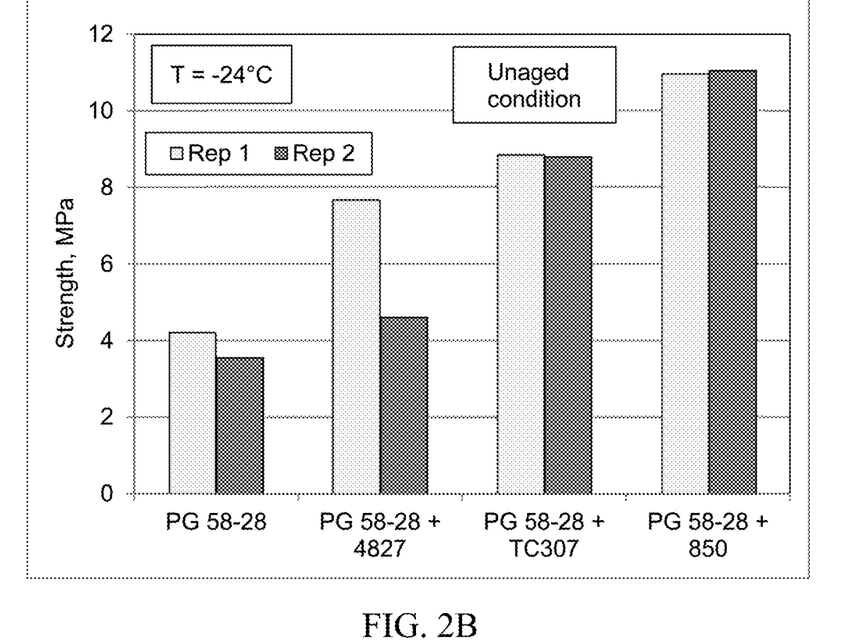

Bending Beam Rheometer strength tests were also performed on the beams at the same temperature of −24° C. The stress strain curves and the strength results are presented in FIGS. 2A and 2B. As seen there, the addition of the three types of graphite has a significant impact on the strength properties of the binder. In particular, the addition of 850 leads to a threefold increase in strength, from 3.9 MPa to 11.5 MPa. At the same time, a twofold increase in failure strain, from 1% to almost 2% is also observed indicating that the strain tolerance of the material also improves.

Low Temperature Rheological and Strength Testing on Asphalt Binders in PAV condition Pressure Aging Vessel (PAV) is a laboratory test that simulates the aging process in the field of an asphalt pavement during 5-7 years of service and is used to obtain the low and intermediate temperature properties of asphalt binders for specification purposes. The two binders were a plain PG-52-34 (obtained from Flint Hills Resources, St. Paul, Minn.), and a more expensive polymer (SBS) modified PG64-34 (obtained from Flint Hills Resources, St. Paul, Minn.). The three types of graphite included in this specific example included 850, 4827 and MICRO750: a graphite micro-flake material with 96.22% carbon, 0.11% moisture and 0.03% 325 mesh. The average surface area was 12.99 m2/g (obtained from Asbury Carbons Inc. and referred to herein as 750). The graphite was added to the liquid un-aged asphalt binders in two amounts: 3% and 6% by weight. The compositions were then aged using the Rolling Thin Film Oven Test (RTFOT) followed by the PAV test and vacuum degassing to obtain PAV-aged asphalt binders according to current AASHTO specifications.

Figure 3:
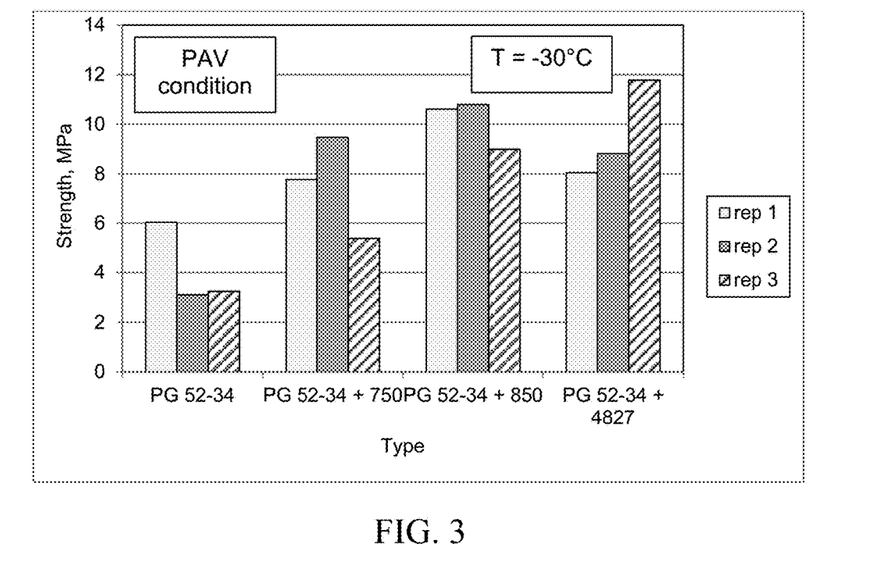
FIG. 3 is a bar graph comparing the strength (MPa) of various compositions.

Similar to the results above, the most significant improvement was observed in the strength properties of the PAV binders at low temperature, in particular for the unmodified binder. The results obtained at −30 C using 3% graphite by weight are shown in FIG. 3. As seen in FIG. 3, the addition of 3% of 750 increases the strength 1.8 times, the addition of 3% 850 increases the strength 2.5 times, and the addition of 3% 850 increases the strength 2.3 times. Improvements were also observed when similar amounts of graphite are added to the polymer modified binder that already has good strength properties, as seen in FIG. 4.

Figure 4:
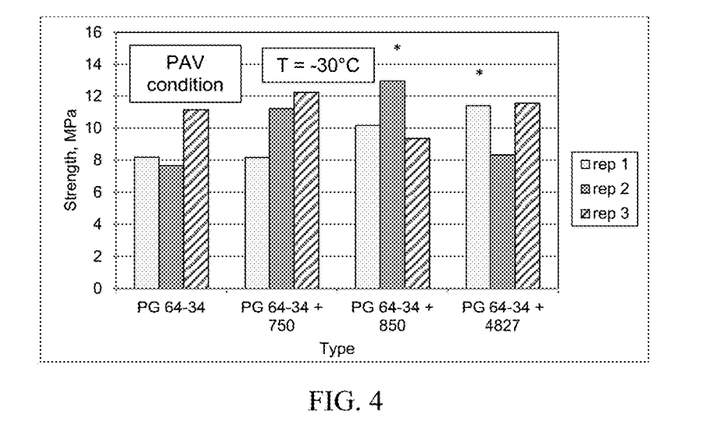
FIG. 4 is a bar graph comparing the strength (MPa) of various compositions.
Figure 5:
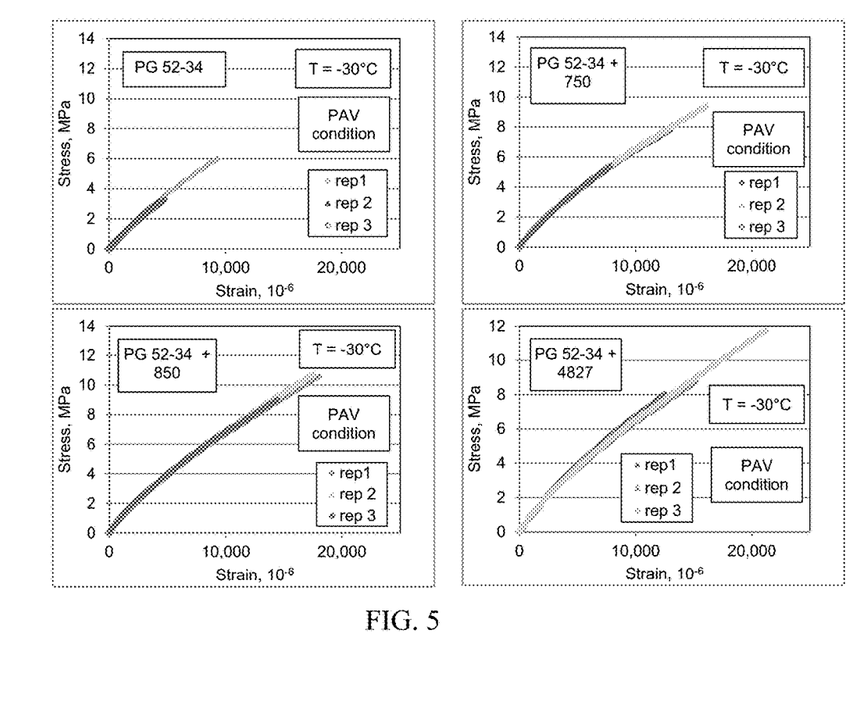
FIG. 5 shows stress (MPa) versus strain for various compositions.

The starred bars in FIG. 4 indicate that the stress exceeded the testing equipment limits and the strength could be higher than the values plotted. On average the increase in strength was approximately 20%. It is important to note that the increase in strain at failure were similar to the increases in strength, a clear indication that the strain tolerance of the graphite reinforced binders were significantly improved. Examples are shown in FIG. 5.

Figure 6:
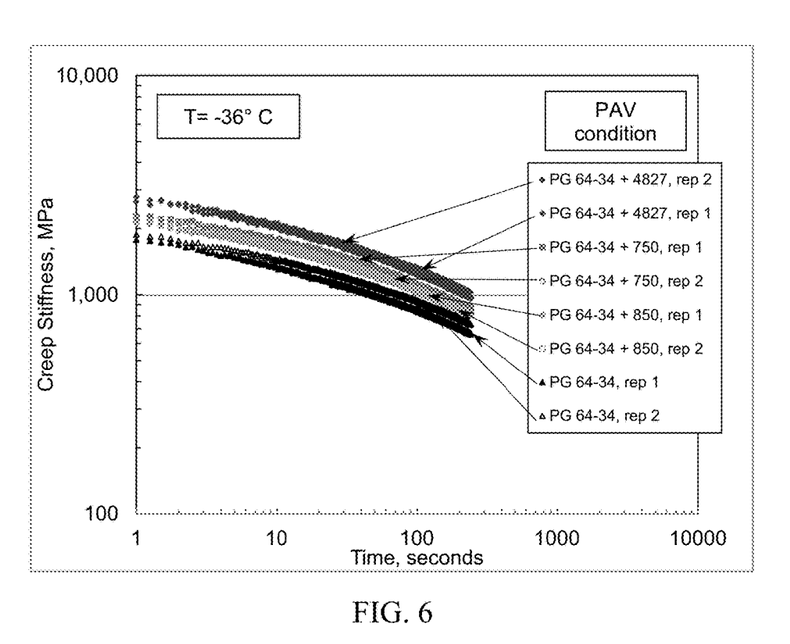
FIG. 6 shows creep stiffness (MPa) versus time for various compositions.

From the analysis of the creep tests performed with the Bending Beam Rheometer (BBR) it can be observed that the creep stiffness increased by 10% to 30%. More importantly, however, is the fact that the m-value, which is an indication of the relaxation properties of the binders, decreases by 10% at the most, and in some cases it increases by 5%, which represents an improvement in relaxation properties. Examples are shown in FIG. 6.

These results indicate that the significant increase in strength properties observed when adding graphite does not negatively affect the relaxation properties of the binders, an occurrence typically observed when other additives are added to binders.

Figure 7:
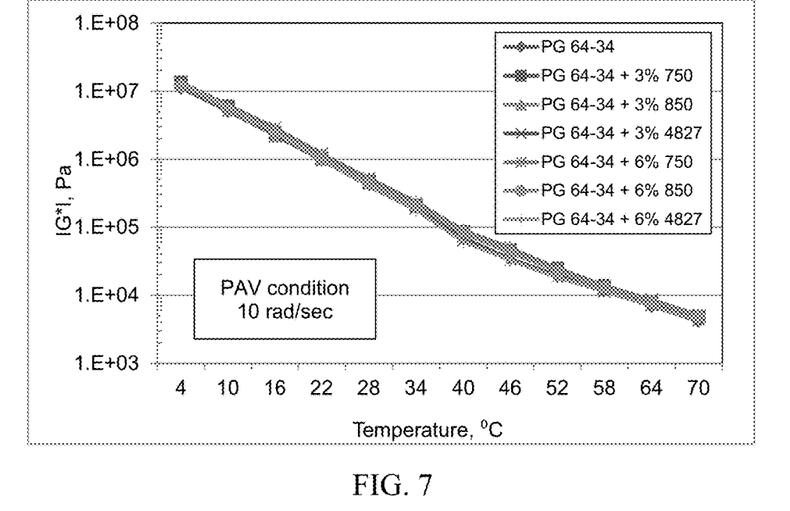
FIG. 7 shows |G*| (Pa) versus temperature (° C.) for various compositions.
Figure 8:
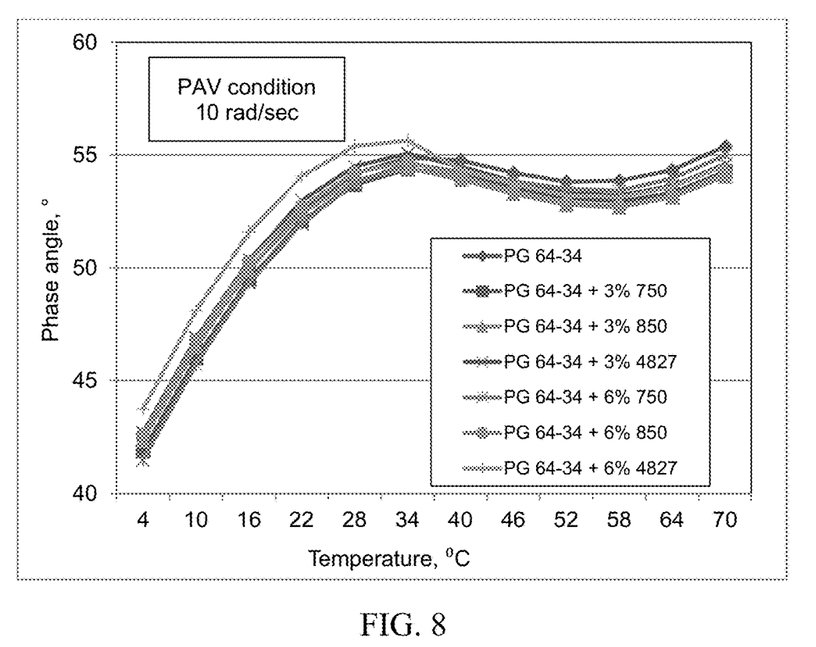
FIG. 8 shows the phase angle versus temperature (° C.) for various compositions.

Intermediate and High Temperature Rheological Testing of Asphalt Binders in the PAV Aging Condition Rheological tests were also performed using the Dynamic Shear Rheometer (DSR) and master curves of the norm of the complex modulus and of the phase angle were generated. The results are presented in FIGS. 7 and 8. No significant changes were observed in the two material parameters at high and intermediate service temperatures when 3% or 6% graphite by weight is added to the asphalt binders investigated.

The results shown here show that the addition of 3 to 6% graphite significantly improves the strength properties and strain tolerance of asphalt binders at low temperatures. At the same time, the relaxation properties at these low temperatures are not negatively affected. No significant changes were observed in the intermediate and high service temperature properties of asphalt binders when graphite was added. Since the intermediate and high temperature properties were obtained in the linear viscoelastic regime, further investigation is needed to explore the nonlinear behavior of these materials.

Effect on Asphalt Mixture Compaction when Graphite is Added to the Asphalt Binder PG 58-28 binder was used to prepare an asphalt mixture using a Superpave mix design with 12.5 mm nominal maximum aggregate size. The binder content was 5.5% (by weight). Two types of graphite, Micro 850 and 4827, were mixed by hand with the binder in the amounts presented in Table 1. For the asphalt mixture sample size used in the study, 297 grams corresponds to 5.5% binder content. The following blends were made:

Blend A had 5.5 wt % of binder and no graphite.

In Blend B 18 g of binder (from a Blend A mix) were replaced with 18 g of 850 (6 wt % graphite with respect to the binder weight) in order to maintain the binder-graphite blend at 5.5 wt % (of the total mixture weight) proportion.

For Blend C, 84 g of 850 was added to the 297 g of binders (from Blend A). This represents a 1:1 volume ratio between the binder and the graphite, which is equivalent to 28% of binder weight.

Blend D has 297 g of binder plus 23 g of 4827, which represents 8% of binder weight.

TABLE 1

Binder-graphite blends used to prepare asphalt mixture samples for compaction study

| Blend | Binder grams | Graphite grams |
|---|---|---|
| A: binder only | 297 | 0 |
| B: binder + 6% Micro 850 | 279 | 18 |
| C: binder + 28% Micro 850 | 297 | 84 |
| D: binder + 8% 4827 | 297 | 23 |

The blends were left for a day and then the preheated aggregates were mixed with the heated binder-graphite blend at 145° C., and kept in the oven for two hours at 135° C. One cylinder was compacted using a Superpave gyratory compactor at 5% air voids target for each type of mix. The compaction curves are presented in FIG. 9.

Figure 9:
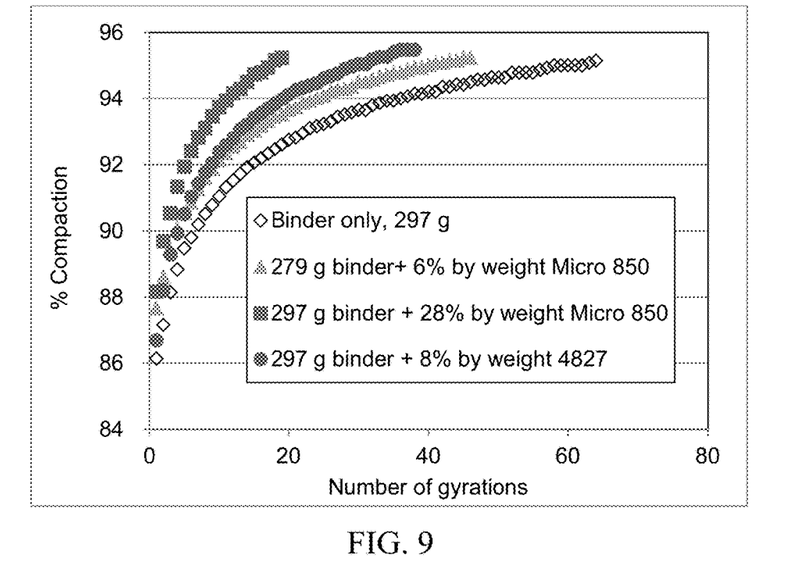
FIG. 9 shows compaction curves (% compaction) for various compositions.

It can be observed that the addition of graphite component decreases the number of gyrations required to compact the mixture to 5% air voids (95% compaction). The most significant effect was obtained when adding 28% (by weight of binder) of the 850 graphite. A smaller reduction was obtained when only 6% was added.

Effect on Asphalt Mixture Compaction when Graphite is Added to Loose Asphalt Mixture The effect on compaction when graphite is added directly to an already prepared (loose) mixture. The binder used to produce this mixture was PG 58-28 used in the previous examples, and the mixture was prepared using a Superpave mix design with 19 mm nominal maximum aggregate size. The loose mix had been stored in sealed buckets at constant room temperature since 2010. Note that this mix design was different than the one used in the previous experiment and the number of gyrations required to compact this mixture to 5% air voids was lower.

The buckets containing loose mix were heated in the oven at 145° C. for about two hours. After heating, four pans were filled with 7.1 kg of loose mix. The loose mix from the first pan, the control sample, was poured in the mixer bowl without any additional material. After 6 minutes of mixing, 7.020 kg were poured back into the pan sitting on the scale, and then kept in the oven for another two hours at 135° C. The loose mix from the other three pans was blended with three different types of graphite: grade Micro 850, Micro 750 an 4827. A 7 kg compacted cylinder contains 5.5% binder, (0.385 kg). The amount of graphite added was 8% of asphalt binder weight, which means 31 grams, or 0.44% from the total weight of the mixture. The graphite particles were added gradually, during a two minutes period, to the mixing bowl, which already contained the loose mix. The mechanical mixing process took 6 minutes in total. In a similar way, 7.020 kg were poured back into the pan sitting on the scale, and then kept in the oven for another two hours at 135° C. for conditioning.

Figure 10:
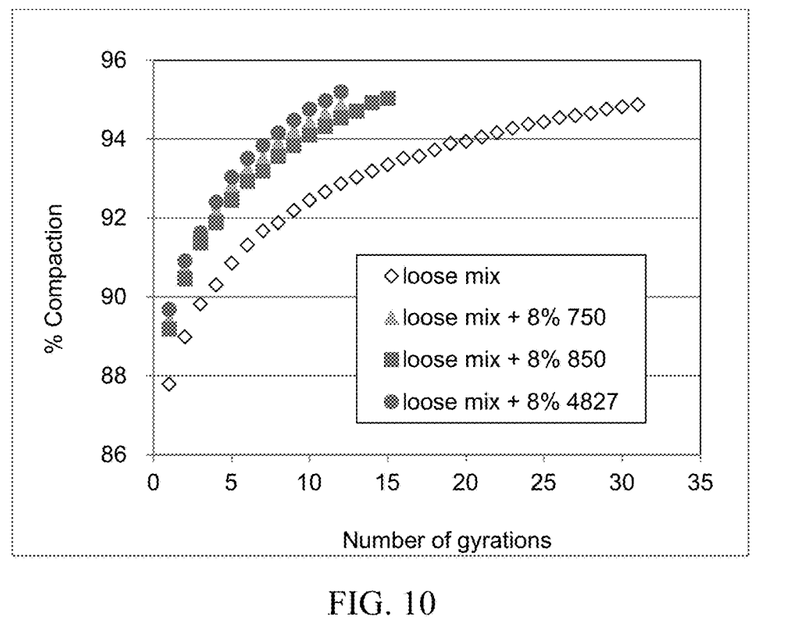
FIG. 10 shows compaction curves (% compaction) for various compositions.

After two hours, four cylinders were compacted at 5% air voids using a gyratory compactor and following the current AASHTO procedure. The compaction curves are presented in FIG. 10. After the first gyration a 2% air void reduction is already noticed in the graphite added samples versus the control sample. The 5% air void target was reached after 12 to 15 gyrations for the graphite coated mix, and after 31 gyrations for the control mix. This represents a significant reduction in the compaction effort and deserves further investigation.

The results presented herein indicate that graphite addition to the binder as well as directly to the loose mix decreases the compaction effort. It is not known if the same mechanism is responsible for the reduction in compaction effort for the two different situations.

From a technological point of view, it is not clear if adding the graphite to the binder is more expensive than adding it to the mixture directly. Based on the results of the separate investigation on the change in mechanical properties, it appears that adding graphite to the binder may improve the fracture properties of binders and of the mixtures made with these binders, and may also reduce the compaction effort.
Effect of Compaction on Rutting Depth in Graphite Containing Composition A first mixture of 95% aggregate and 5% binder by weight, and a second mixture that included the first mixture combined with 6% by weight of binder MICRO850: a Graphite micro-flake material with 99.54% Carbon, 0.28% Moisture and 0.05%+325 mesh (Asbury Carbons, Inc.) were subjected to mechanical testing to investigate if the addition of graphite makes asphalt mixtures prone to rutting (accumulation of permanent deformation under cycles of loading at high service temperature, such as 58° C.). Such testing was undertaken to address concerns that a "lubricant" effect that may be responsible for the reduction in compaction effort (shown above) at conventional compaction temperatures (130° to 140° C. for example) can remain significant even at higher temperatures (e.g., summer service temperatures).

Figure 11:
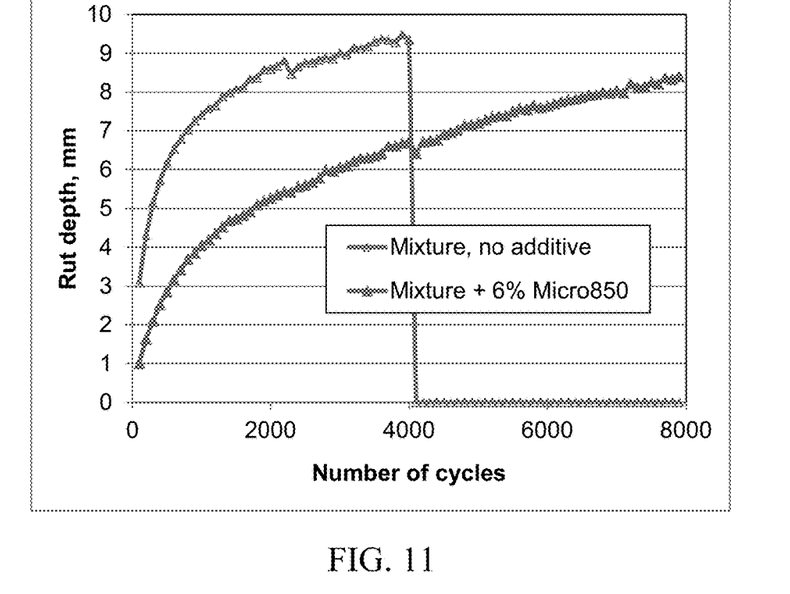
FIG. 11 shows rut depth versus number of compaction cycles for a mixture that includes graphite and one that does not.

The mechanical testing was performed with an APA rut testing device. The two mixtures were compacted at 130° C. to 7% air voids. The results seen in FIG. 11 show that the addition of graphite improves resistance to rutting.

One skilled in the art will appreciate that the articles, devices and methods described herein can be practiced with embodiments other than those disclosed. The disclosed embodiments are presented for purposes of illustration and not limitation. One will also understand that components of the articles, devices and methods depicted and described with regard to the figures and embodiments herein may be interchangeable.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

The invention claimed is:

1. A composition comprising:
   asphalt component; and
   about 3 wt % to about 6 wt % of graphite nanoplatelets with respect to the weight of the asphalt component.

2. The composition according to claim 1, wherein the asphalt component comprises asphalt binder.

3. The composition according to claim 1, wherein the asphalt component comprises roof binder, asphalt emulsion, recycled asphalt pavement (RAP), recycled asphalt shingles (RAS), or a combination thereof.

4. The composition according to claim 1 further comprising aggregate.

5. The composition according to claim 1, wherein the asphalt component comprises asphalt binder and recycled asphalt pavement (RAP).

6. The composition according to claim 1, wherein the asphalt component comprises asphalt binder and recycled asphalt shingles (RAS).

7. A method of forming a composition comprising: mixing asphalt binder and about 3 wt % to about 6 wt % of graphite nanoplatelets to form a binder composition.

8. The method according to claim 7 wherein the graphite component is added to the asphalt binder.

9. The method according to claim 7 further comprising adding the binder composition to aggregate to form a paving composition.

10. The method according to claim 9 further comprising depositing the paving composition in a desired area and compacting the deposited paving composition to form pavement.

11. The method according to claim 10, wherein the paving composition is deposited in an area of existing pavement.

12. The method according to claim 7 further comprising adding the binder composition to recycled asphalt pavement ("RAP") to form a paving composition.

13. The method according to claim 7 further comprising adding the binder composition to reclaimed asphalt shingles ("RAS") to form a shingle forming composition.

14. The method according to claim 13 further comprising forming a shingle from the shingle forming composition.

15. A composition comprising:
    asphalt component comprising asphalt binder selected from the group consisting of PG 58-28, PG 52-34, PG 64-34, and combinations thereof; and
    about 3 wt % to about 6 wt % of graphite component comprising graphite nano-platelets, graphite micro-flakes, or a combination thereof.

16. The composition according to claim 15, wherein the graphite component comprises, graphite micro-flakes.

17. The composition according to claim 15, further comprising recycled asphalt pavement (RAP).

* * * * *